Dec. 10, 1940.   K. L. WIXSON   2,224,757
STUMP SAW
Filed April 28, 1939   3 Sheets-Sheet 1
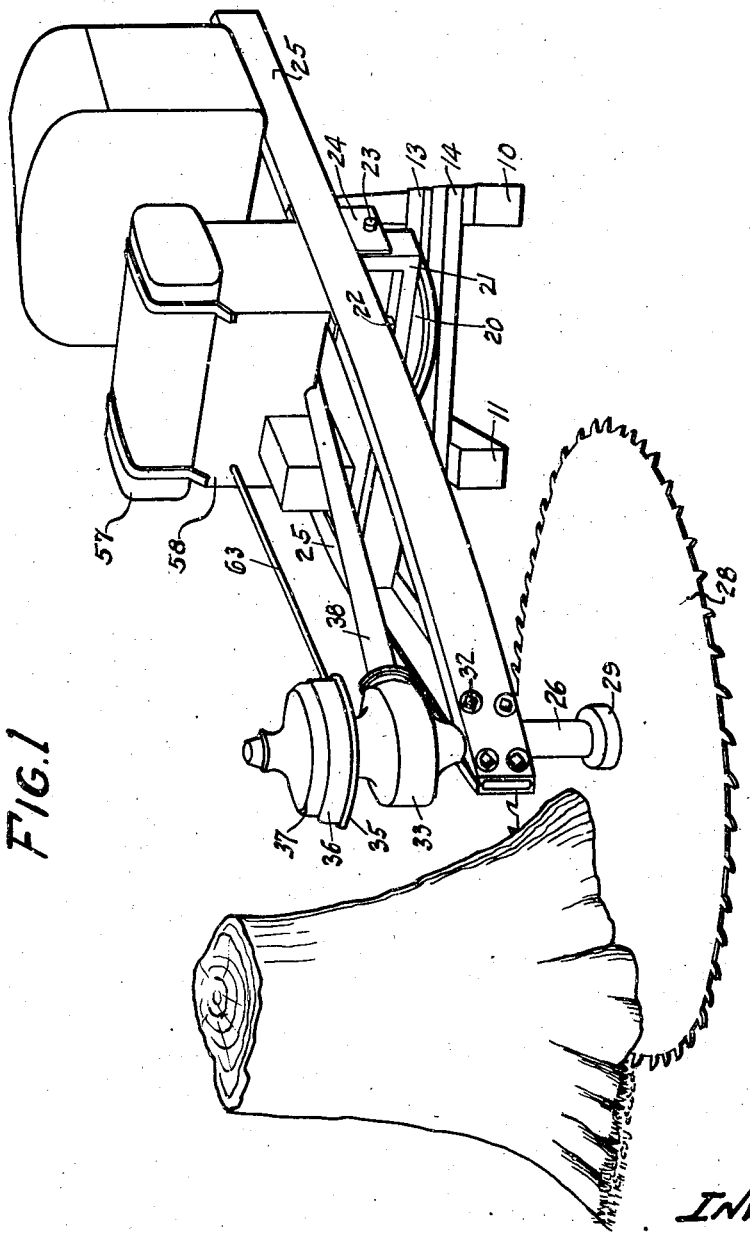
INVENTOR
KENNETH L. WIXSON
By J.H. Weatherford
Atty.

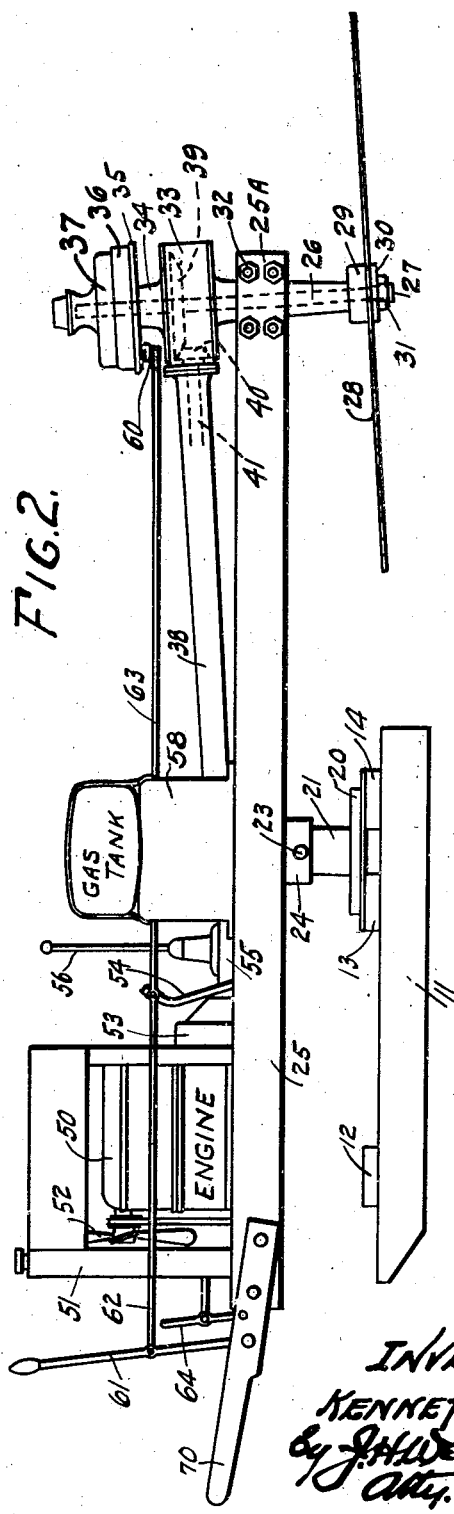

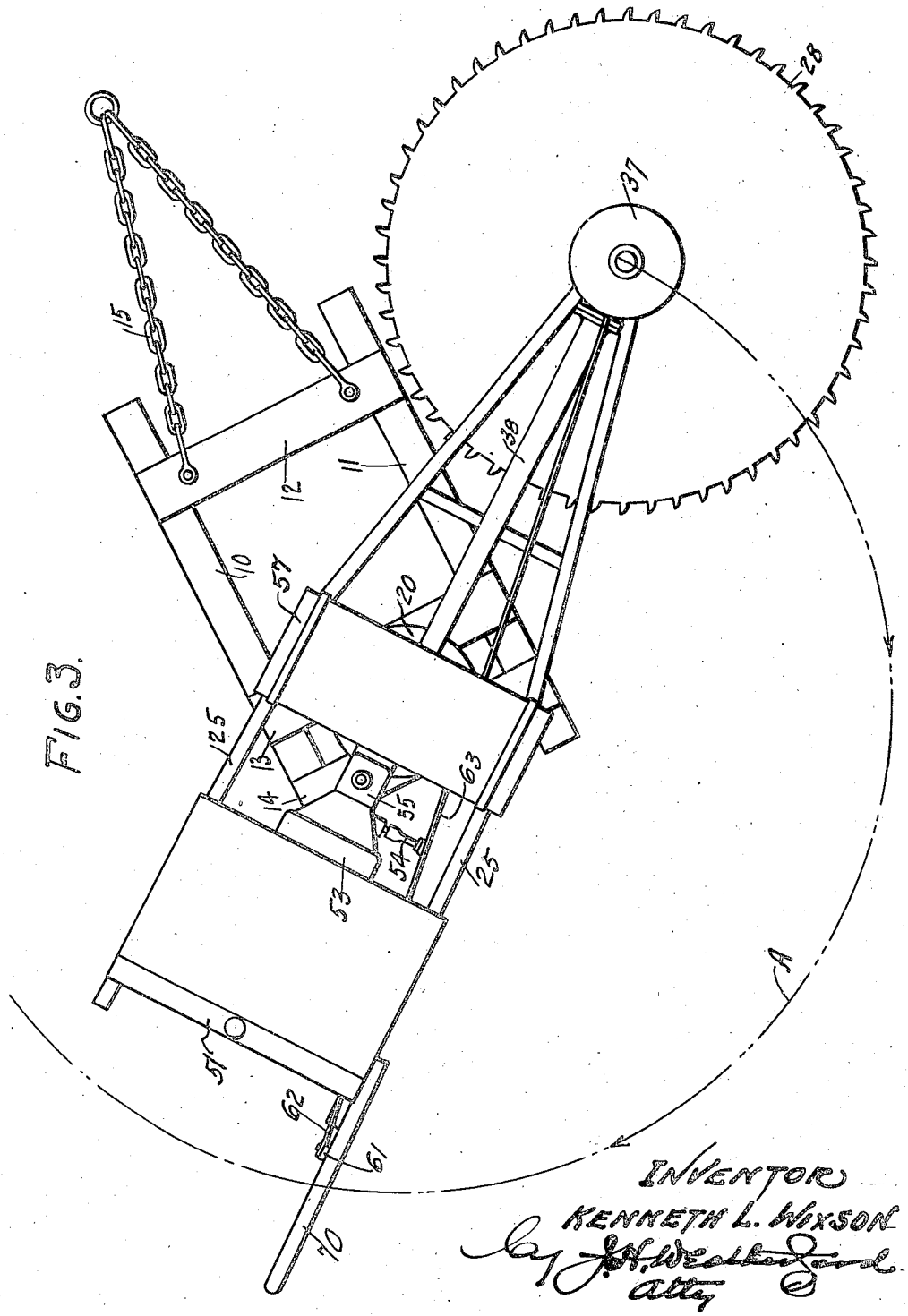

Patented Dec. 10, 1940

2,224,757

UNITED STATES PATENT OFFICE 2,224,757

STUMP SAW

Kenneth L. Wixson, Fisher, Ark.

Application April 28, 1939, Serial No. 270,549

4 Claims. (Cl. 143—43)

This invention relates to improvements in stump saws; that is, to saws which are designed to make a substantially horizontal cut extremely close to the surface of the ground, and particularly to devices of this kind in which a circular saw is used.

In clearing ground the trees are ordinarily cut off at a convenient height, ordinarily around two feet above the ground, and the stumps so left interfere seriously with cultivation, not only in so far as the space they occupy below the ground is concerned, but because they additionally cause a diversion of approaching and receding plows or other cultivating apparatus. In many cases it is desired to use tractors and gang plows and the upstanding stumps prevent. If, however, the stumps are cut off level with the ground the tractor can pass thereover and an individual plow, or plows, of the gang can be raised when the stump is reached and obstruction to cultivation be largely minimized. Also where disc plows are used the discs ride over the stumps and cultivation can be carried out with very little hindrance.

The primary object of the present device is to provide means for cutting off the stumps at the ground level with a maximum of efficiency and minimum of effort.

A further object is to make a device of this kind which can be readily moved into proximity to the work and which when so moved is ready for immediate use.

A further object is to make a device of this character in which the level of the saw and consequent cut is manually controllable to take care of relative inequalities in the level of the ground at the stump and the level or slope of the ground on which the mechanism is supported.

A further object is to make a device of this character in which the movement of the saw into cutting position is also manually controllable and the feed of the saw in making the cut is likewise controllable and may be varied in accordance with the length of the cutting arc, the hardness of the material and other factors which may enter into the problem; and A still further object is to provide means for disconnecting the power and concurrently checking the saw speed as the cut is being completed, whereby small stumps particularly may not be picked up and thrown laterally with sometimes damaging results.

The means by which the foregoing and other objects are accomplished and the method of their accomplishment will readily be understood from the following specification on reference to the accompanying drawings, in which:

Fig. 1 is a perspective view of the device cutting a stump.

Fig. 2 is a side elevation; and

Fig. 3 a plan.

Referring now to the drawings in which the various parts are indicated by numerals:

10, 11 are the runners of a sled, which runners are secured together by cross members 12, 13 and 14. 15 is a chain through which the sled may be attached to suitable tractive mechanism and be moved from place to place.

Supported on the two cross members 13, 14 is a turntable 20 which supports a substantially U shaped cradle 21, this cradle being turnable about a vertical axis 22 extending upward from the center of the table 20. 23 are trunnions extending horizontally outward from the opposite sides of the cradle 21, which trunnions form horizontal pivots for brackets 24, extending downward from channel shaped side frames 25 supporting the working mechanism, which trunnions and brackets provide for a see-saw movement of said frame and mechanisms.

26 is a tubular housing which encloses a shaft 27, to the lower end of which shaft a circular saw 28 is secured in usual manner between a shaft-carried collar 29, and a collar 30 and nut 31. The housing 26 is securely clamped between, and to, the forward ends 25—A of the frame as by bolts and nuts 32. The length of the housing 26 below the frame members 25 and correspondingly the distance of the saw 28 below these members is somewhat less than the distance from the bottom of the frame to the bottom of the sled, so that when the frame is in horizontal position the saw is supported well above the level of the bottom of the sled; and the axis of the shaft 27 and of the housing 26 are so inclined to the frame 25 that the saw when depressed substantially to the level of the bottom of the sled will be level. Above the frame, the housing 26 carries a gear housing 33 and thereabove an additional housing 34 carries the fixed portion 35 of an internally expanding brake, such as is common in automobiles.

36 is a rotatable brake drum within which are the usual brake shoes, which being well known and operating in usual manner are not shown. This drum is connected to a hub 37 which is securely mounted on the upper end of the shaft 27. Extending forwardly from the gear housing 33 is an additional housing 38, the housing parts and brake members above mentioned having in the present instance been taken without substantial change, except the shortening of the housing part 34, from a well known type of automobile rear axle, the housing 38 being the torque tube of such assembly. The shaft 27 is however a through shaft instead of the usual two part floating axle and is suitably journalled within the housing. Mounted and solidly secured on the shaft 27 is a bevel gear 39 which meshes with the usual bevel pinion 40, secured on the usual auto-torque shaft 41, the gear 39 being shown because of deviation from the usual differential gear.

Mounted on the rear of the frame 25 is an internal combustion engine 50, a typical automobile engine being indicated with the usual radiator 51, fan 52 and clutch, 53 being the clutch housing and 54 the clutch pedal lever, 55 the transmission case and 56 the gear shift lever. 57 is the gas tank and 58 a support for this tank which here hides the usual universal joint to which the torque tube 38 and shaft 41 lead in usual and well known manner.

The weight of the various parts of the mechanism are so distributed with reference to the trunnions 23 that the entire device is as nearly as possible balanced over these trunnions.

60 is a lever adapted to operate the brake shoes against the drum 36; 61 is a lever which is operatively connected by a link 62 with the clutch pedal lever 54 and by an extension 63 of this link to the brake lever 60. 64 is the throttle lever.

70 is an arm or handle lever secured to one of the frames 25, through which manual pressure is applied to raise or lower the saw 29, and to swing the saw into or out of cutting contact with the stumps.

In using the device a team or tractor is hitched to the chain 15 and the sled drawn to position adjacent the stump which is to be cut, it being usual to so place the sled that the saw collar 29 may be swung past the stump when the frame 26 is turned about the center pin 22. With the transmission 55 in neutral, the engine is started in usual manner and when up to speed, the lever 61 is retracted, disconnecting the clutch, and incidentally setting the brake, and the transmission thrown into gear, any one of the gear combinations obviously being usable but ordinarily high gear being that one selected. The arm 70 is then raised and the saw lowered as close as is feasible or desirable to the ground, and is moved laterally into cutting contact with the stump. Pressure is exerted laterally on the saw to advance the saw as rapidly as the power of the engine will permit and this pressure is continued until the cut is completed. If the stump be a small one a single cut will complete the job. In such case, as the cut is completed, the lever 61 is again pulled back disconnecting the clutch and at the same time applying the brake to stop rotation of the saw. Should this not be done the saw will often pick up the small stump and throw it with considerable force to one side, often causing damage to the machinery or adjacent objects, or even endangering life and limb.

Should a stump, such as the stump shown in Fig. 1, be of such size that it cannot be cut entirely through in one cut the sled must obviously be moved to an additional position, or positions, and one or more additional cuts be made to finish the work. Obviously stumps are occasionally met with where no cut can reach the center and such stumps obviously cannot be cleanly cut off and would require additional treatment. This, however, is largely governed by the diameter of the saw and under the usual conditions seldom occurs.

In placing the device initially it is often possible to so place it that several stumps may be cut from one setting. In Fig. 3 the circular arc A indicating the path of the saw mandrel shows that it is possible to accomplish a rotary movement about the center pivot 22 of about three-quarters of a full turn and it will be evident that stumps may be cut not only near the end of the sled but actually on diametrically opposite sides of the sled as well. In such case if the stumps are large partial cuts are made on all within reach before shift is made.

I claim:

1. In a stump saw a substantially horizontal and stable base adapted for shifting from place to place, a turntable mounted on and entirely above said base, said table having an axis perpendicular to said base, a cradle carried by said table, extending upward therefrom and turnable therewith, trunnions extending laterally from opposite sides of said cradle, a frame spaced entirely above said base, pivotally mounted for see-saw movement on said trunnions and for complete turning movement with said cradle about said base, bearing means in upright alinement carried by one end of said frame, a shaft journalled in said bearings, a circular saw secured on the lower end of said shaft, means mounted on the opposite end of said frame for driving said shaft and for balancing the weight of said saw parts about said turntable and trunnions, means operably connecting said driving means and said saw, and manually controllable means connected to said frame whereby said saw may be shifted into cutting attack with stumps within the cutting reach of said saw and from diametrically opposite directions.

2. In a stump saw, a substantially stable and horizontal base adapted for shifting from place to place, a turntable mounted on and entirely above said base, said turntable having a substantially vertical axis, means carried by said table, extending upward therefrom and turnable about said axis, a frame, spaced entirely above said base, pivotally mounted for seesaw movement in said means and for complete turning movement with said means about said base, bearing means in upright alinement carried by one end of said frame, a shaft journalled in said bearings, a circular saw secured on the lower end of said shaft, means mounted on the opposite end of said frame for driving said shaft, and for balancing the weight of said saw parts about said turntable and pivotal mounting, means connecting said driving means and said saw, and handles connected to said frame whereby said saw may be manually shifted from diametrically opposite directions into substantially horizontal cutting attack with stumps within the cutting reach of said saw.

3. A stump saw including a housing, bearings in substantially upright alinement carried by said housing, a shaft journalled in said bearings, a circular saw secured on the lower end of said shaft, said housing being horizontally shiftable to bring said saw into cutting engagement with said stump, complementary braking means carried by said housing and said shaft, means for driving said shaft, means, including a clutch for effecting operable connection between said driving means and said shaft, and means manually operable for disconnecting said clutch and concurrently actuating said brake, whereby to check saw speed as a cut is completed and prevent unwanted throwing of a cut off stump.

4. A stump saw including a base adapted for shifting from place to place, a frame turnably mounted on said base for pivotal movement about an axis perpendicular to said base, a housing carried by one end of said frame, bearing means in upright alinement carried by said housing, an upright shaft journalled in said bearings, a circular saw secured on the lower end of said shaft, an engine mounted on said frame for driving said shaft, complementary braking means carried by said housing and said shaft, means including a clutch for operably connecting said engine and shaft, and means manually operable for disconnecting said clutch and concurrently actuating said brake, whereby to check saw speed as a cut is completed and prevent unwanted throwing of a cut off stump.

KENNETH L. WIXSON.